C. T. MYERS.
BRACKET FOR AUTOMOBILES OR SIMILAR VEHICLES.
APPLICATION FILED MAR. 12, 1917.

1,314,689.

Patented Sept. 2, 1919.
2 SHEETS—SHEET 1.

Inventor
Cornelius T. Myers.

Witness
Charles Balg
Karl H. Butler

By
Attorneys

C. T. MYERS.
BRACKET FOR AUTOMOBILES OR SIMILAR VEHICLES.
APPLICATION FILED MAR. 12, 1917.

1,314,689.

Patented Sept. 2, 1919.
2 SHEETS—SHEET 2.

Inventor
Cornelius T. Myers.

Witness
Charles Bale
Charles H. Butler

By
[signature]
Attorneys

UNITED STATES PATENT OFFICE.

CORNELIUS T. MYERS, OF DETROIT, MICHIGAN.

BRACKET FOR AUTOMOBILES OR SIMILAR VEHICLES.

1,314,689.  Specification of Letters Patent.  Patented Sept. 2, 1919.

Application filed March 12, 1917. Serial No. 154,343.

*To all whom it may concern:*

Be it known that I, CORNELIUS T. MYERS, a citizen of the United States of America, residing at Detroit, in the county of Wayne and State of Michigan, have invented certain new and useful Improvements in Brackets for Automobiles or Similar Vehicles, of which the following is a specification, reference being had therein to the accompanying drawings.

This invention relates to spring brackets for automobiles and similar vehicles, and has special reference to brackets, shackles, and similar devices to which the springs or spring suspension members of a vehicle are attached.

The object of my invention is to provide spring brackets embodying lubricant reservoirs with the principle of capillary attraction employed for economically supplying lubricant to a bolt, pin, sleeve or other part of the bracket to which a spring is attached. Each bracket includes a construction that can be easily and quickly installed, readily cleaned or flushed, that provides rigidity with a minimum amount of material, and permits of lubricant being readily placed in the bracket.

I attain the above object in connection with each of the brackets shown in the accompanying drawings, wherein—

Figure 1:
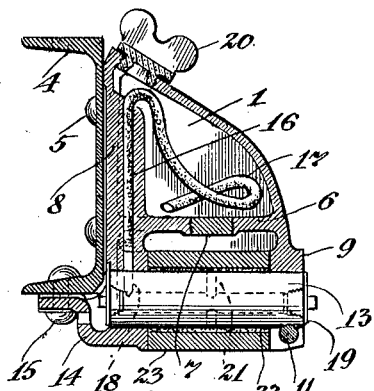
Figure 1 is a vertical sectional view of a side bracket.
Figure 2:
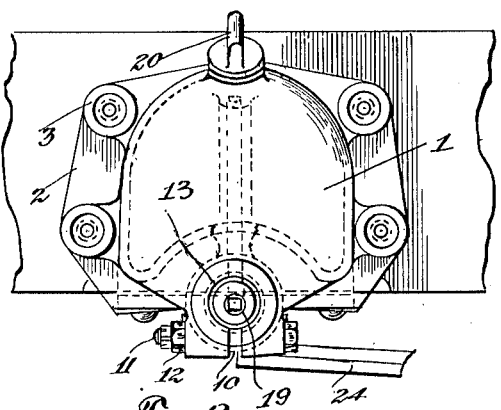
Fig. 2 is a side elevation of the same.

Considering Figs. 1 and 2, 1 denotes a receptacle provided with side flanges 2 and apertured lugs 3 so that it may be connected to the side of a vehicle channel frame 4 by bolts 5, rivets or other fastening means. The receptacle 1 has a bottom plate 6 provided with a detachable plug 7, and the rear wall 8 is enlarged and of greater depth than the front wall so that the lower portion thereof will confront a depending flange 9 at the front side of the receptacle 1. The depending flange 9 is bifurcated, as at 10, and the sides thereof connected by a bolt 11 and nuts 12, so that the flange may be clamped about the outer end of a tubular pin 13 extending into the rear wall 8 of the receptacle. The lower edge of the rear wall 8 has a flange 14 riveted or otherwise connected as at 15, to the bottom flange of the channel frame 4. The rear wall 8 also has a vertical opening 16 to receive the end of a wick 17 that is in the receptacle 1 to become saturated with oil or other lubricant placed therein. The wick extends downwardly through the opening 16 into a port 18 provided therefor in the tubular pin 13, and said tubular pin has the ends thereof closed by detachable plugs 19.

A detachable cap 20 at the top of the receptacle 1 permits of the lubricant being easily placed in said receptacle.

The tubular pin 13 has additional ports 21 which permit of the contents of said pin flowing on to a bushing 22 in the eye or barrel 23 of a spring 24 which is held by said tubular pin relative to the bracket. To remove the spring, it is only necessary to loosen the bolt 11 whereby the flange 9 releases the outer end of the tubular pin 13 and then by withdrawing said pin the barrel of the spring 24 can be lowered and removed from beneath the bracket.

Figure 3:
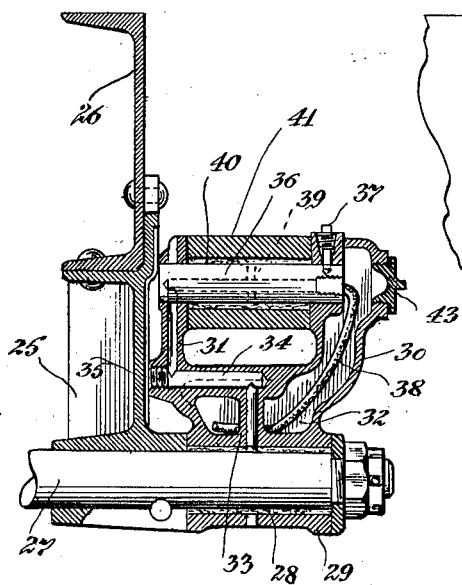
Fig. 3 is a vertical sectional view of the depending bracket.
Figure 4:
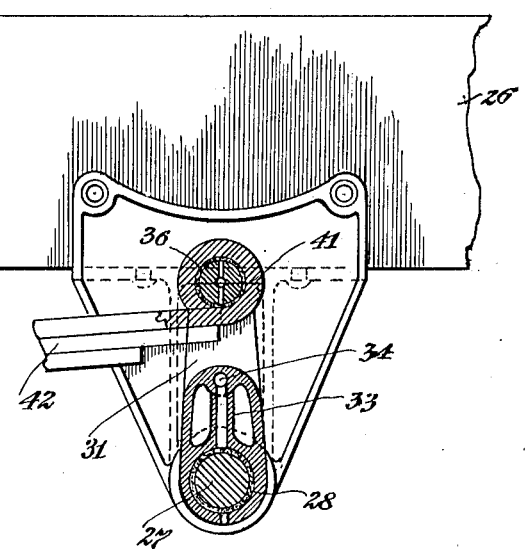
Fig. 4 is a side elevation of the same partly in section.

Referring to Figs. 3 and 4, a depending bracket 25 is connected to the lower edge of a vehicle channel frame 26 and in the bracket 25 is mounted a transverse rod 27. On the outer end of the rod 27, is a bushing 28 of a bearing 29, said bearing forming part of a spring shackle having arms 30 and 31, and the bearing 29 provides a lubricant chamber 32 having a ported web 33. The arms 30 and 31 are hollow with the arm 30 communicating with the chamber 32 and the arm 31 communicating with the ported web 33 through a port 34 closed by a plug 35. The upper ends of the arms support a tubular pin 36 in communication with the arm 31 and said pin is held in position by a retaining pin or plug 37. A wick 38 in the chamber 32 extends into the tubular pin 36, so that the lubricant will be conducted upwardly through the tubular pin, down through the arm 31 and through the port 34 and the web 33 to the bushing 28. The pin 36 is ported as at 39 so that some of the lubricant will reach a bushing 40 in the barrel 41 of a spring 42.

A detachable cap or plug 43 permits of the chamber 32 being supplied with lubricant.

Figure 5:
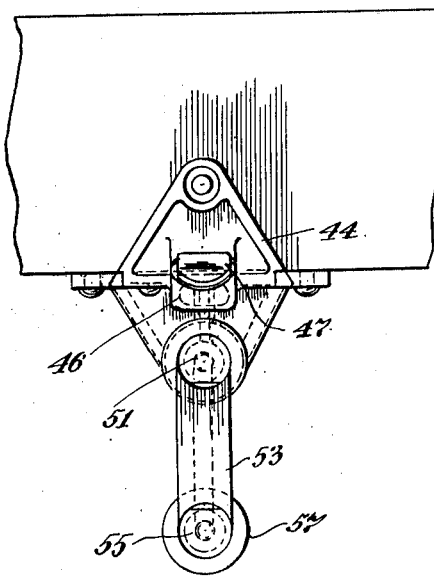
Fig. 5 is a side elevation of a shackle bracket.
Figure 6:
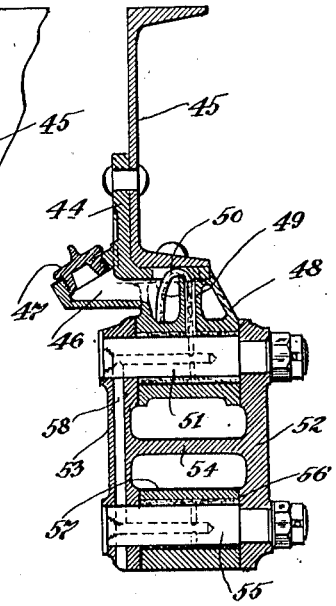
Fig. 6 is a vertical sectional view of the same.

Considering the construction shown in Figs. 5 and 6, an angle bracket 44 is connected to a vehicle channel frame 45 and said bracket provides a lubricant chamber 46 adapted to be filled with oil or other lubricant by removing a detachable cap 47. The bracket 44 has a bearing 48 ported, as at 49, to receive a wick 50 that conveys lubricant from the chamber 46 to a ported pin 51 mounted in the bushing of the bearing 48. On the ends of the pin 51 are pivoted shackle arms 52 and 53 connected by a web 54.

Mounted in the lower ends of the arms 52 and 53 is a ported pin 55 extending through the bushing 56 of a spring barrel 57. The ported pin 55 communicates with a port 58 in the arm 53 and this ported arm establishes communication between the ported pins 51 and 55 of the shackle, so that a lubricant supplied to the pin 51 will reach the pin 55 and thus insure a nonfrictional movement of the spring barrel 57 on the pin 55.

Figure 7:
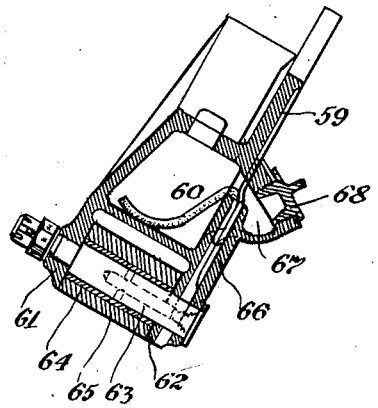
Fig. 7 is a sectional view taken on line 7—7 of Fig. 8.
Figure 8:
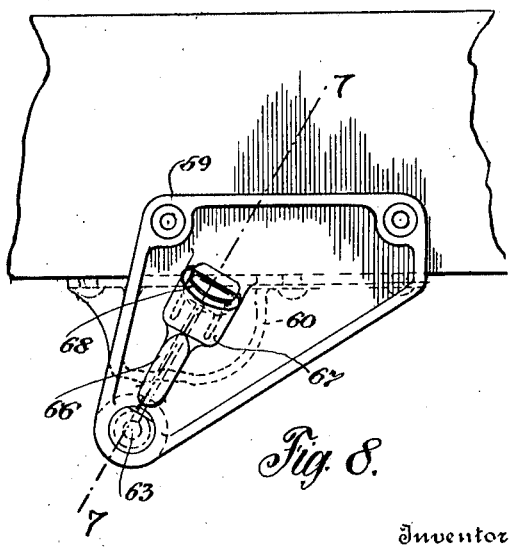
Fig. 8 is a side elevation of the bracket.

Considering now Figs. 7 and 8 an angle bracket 59 has a lubricant receptacle 60 and depending shackle arms 61 and 62, said arms being connected by a ported pin 63 extending through the bushing 64 of a spring barrel 65. The shackle arm 62 is enlarged and ported, as at 66 to communicate with a cup 67 and the end of the ported pin 63. The cup 67 has a detachable cap 68 that permits of the lubricant receptacle or chamber being filled.

From the foregoing it will be observed that the flange 9 and the lower end of the wall 8 of the bracket shown in Figs. 1 and 2 perform the same function as the shackle arms disclosed in the other views of the drawings, and while the preferred embodiments of my invention have been illustrated, it is to be understood that the structural elements are susceptible to such variations and modifications as fall within the scope of the appended claims.

What I claim is:—

1. A bracket and shackle for a vehicle spring comprising a bracket having an interior lubricant chamber, shackle arms carried by said bracket, a ported pin in said shackle arms and adapted for supporting the barrel of the spring, and means for conducting a lubricant from said chamber to said ported pin.

2. A bracket and shackle for a vehicle spring comprising a bracket adapted for attachment to a vehicle frame, said bracket having a chamber therein, shackle arms carried by said bracket with one of said arms ported, a ported pin carried by said arms in communication with the chamber of said bracket and adapted for holding the barrel of a spring, and a wick in the chamber extending into the ported shackle arm adapted to conduct lubricant from said chamber by capillary attraction to said ported pin.

3. A self lubricating attachment for securing the end of a vehicle spring to a vehicle frame, comprising a supporting member secured to the vehicle frame and provided with a pair of spaced arms between which the end of the spring is received, a channeled securing bolt passing through said arms and through the end of said spring, said supporting member provided with a lubricant containing chamber and further provided with an outlet for said lubricant connecting at its discharge end with the channel in said bolt, and a capillary medium for supplying lubricant from said chamber to said channeled bolt.

4. A self lubricating attachment for securing the end of a vehicle spring to the frame of the vehicle, comprising a body provided with an interior lubricant holding chamber, spaced arms carried thereby for receiving the end of a spring, a channeled bolt transversely disposed between said arms for the holding of the spring end therebetween and means for conducting lubricant from the chamber of the body to the channeled securing bolt for the spring end.

5. A self lubricating attachment for securing the end of a vehicle spring to a vehicle frame, comprising a body member of cast material provided on its interior with a lubricant containing chamber, spaced arms carried by said body and between which the spring end is held, a bolt passing through said arms and said spring for retaining the spring in position between the same, there being a lubricant outlet channel connecting said chamber with the surface of said bolt, and means within said chamber for withdrawing the lubricant from the chamber and controlling the feed thereof to said bolt.

6. A self lubricating attachment for securing the end of a vehicle spring to a vehicle frame, comprising a channeled shackle member fulcrumed at one end to a support and fulcrumed at its opposite end to the spring end, a lubricant containing chamber associated therewith for containing a lubricant supply, and a capillary medium for withdrawing liquid therefrom, the withdrawn lubricant passing through the channels of said shackle and lubricating both fulcrum points thereof.

7. A self lubricating attachment for securing the end of a vehicle spring to a vehicle frame, comprising a channeled shackle member fulcrumed at one end to a support and fulcrumed at its opposite end to the spring end, a chamber associated therewith for containing a supply of liquid lubricant, and means leading from said chamber for withdrawing lubricant therefrom and for supplying the same to the fulcrum points of said shackle, the lubricant in its course of travel passing through the channels in said shackle successively from one fulcrum point to another.

8. A self lubricating attachment for securing the end of a vehicle spring to the vehicle frame, comprising a shackle fulcrumed at one end to a support and at its opposite end to the spring end, said shackle formed on its interior with a chamber for containing a fluid lubricant and further provided with a channel connecting said fulcrum points, and means communicating with said chamber and channel for withdrawing lubricant from the chamber and conveying the same to said fulcrum points.

9. A self lubricating attachment for securing the end of a vehicle spring to the vehicle frame, comprising a shackle fulcrumed at one end to a support and at its opposite end to a spring end, said shackle formed intermediate said fulcrum points with a lubricant containing chamber and further provided with a channel connecting said fulcrum points, and a means for withdrawing the lubricant from said chamber and conveying the same to one of said fulcrum points, the excess lubricant from said fulcrum point passing through said channel to the other of said fulcrum points.

In testimony whereof I affix my signature in the presence of two witnesses.

CORNELIUS T. MYERS.

Witnesses:
KARL H. BUTLER,
ANNA M. DORR.